United States Patent [19]

Barr et al.

[11] Patent Number: 4,777,825
[45] Date of Patent: Oct. 18, 1988

[54] STABILIZED REFERENCE SURFACE FOR LASER VIBRATION SENSORS

[75] Inventors: Dallas N. Barr; Clifton S. Fox; John E. Nettleton, all of Prince William County, Va.

[73] Assignee: The United States of America as represented by the Secretary of the Army, Washington, D.C.

[21] Appl. No.: 73,672

[22] Filed: Jul. 15, 1987

[51] Int. Cl.⁴ .............................................. G01N 29/00
[52] U.S. Cl. ...................................... 73/657; 356/349; 356/358
[58] Field of Search .................... 73/657, 655, 652; 356/356, 358, 349, 4.5

[56] References Cited

U.S. PATENT DOCUMENTS

| | | | |
|---|---|---|---|
| 4,180,328 | 12/1979 | Drain | 356/358 |
| 4,379,633 | 4/1983 | Bickel et al. | 73/657 |
| 4,466,738 | 8/1984 | Huang et al. | 73/657 |
| 4,633,715 | 1/1987 | Monchalin | 73/657 |
| 4,688,940 | 8/1987 | Sommargren et al. | 356/358 |

Primary Examiner—Stewart J. Levy
Assistant Examiner—Louis M. Arana
Attorney, Agent, or Firm—Max L. Harwell; Anthony T. Lane; John E. Holford

[57] ABSTRACT

The invention provides a vibration sensor with a platform mounted Bragg cell frequency shifter and heterodyne detection system, wherein the reference beam is modulated with the component of platform vibration normal to the sensing beam, such that a similar modulation of the sensing beam is cancelled by the heterodyning process.

1 Claim, 1 Drawing Sheet

STABILIZED REFERENCE SURFACE FOR LASER VIBRATION SENSORS

BACKGROUND OF THE INVENTION

1. Field

The invention is closely related to coherent laser radar and rangefinding devices. Owing to the very short wavelengths involved, these devices can detect not only position and translation but vibration modes of an active target.

2. Prior Art

Laser radars (LIDAR's) have proven to be effective adjuncts to RADAR's, having better spatial and doppler resolution due to the short wavelength. RADAR is clearly better for extremely long range applications where distances are measured in tens of kilometers. In the measurement of target vibration modes at distances of up to a few kilometers the short wavelengths of LIDAR made it clearly superior. Various pieces of equipment can readily be identified at these distances by a very broad spectrum of characteristic vibration frequencies. Variations in these characteristic frequencies can be used to identify age, loading and other factors that affect the equipment during its useful life.

To best record the above patterns the vibration sensor system has been mounted on an acoustically quiet fixed platform. There are, however, many applications wherein it would be advantageous to make these measurements from a moving platform. Particularly, it would be desirable to be able to make vibration measurements from an aircraft which moves quickly and can reach otherwise inaccessible areas. The added vibration supplied by such moving platforms, however, masks the desired data. The vibrations of the platform could be measured and recorded separately and subtracted from the measurements made on the target, but this would be a complex and costly procedure.

SUMMARY OF THE INVENTION

The present invention provides a laser vibration sensor wherein the vibration of the laser platform which affect the measurement of vibrations of a distant target are eliminated before the vibration measurements are recorded. The sensor utilizes a single Bragg cell heterodyne detection system. The invention utilizes a modulation mirror in the reference beam of this system to cancel the platform vibrations from the measurement beam which travels to and from the target.

BRIEF DESCRIPTION OF THE DRAWINGS

The invention is best understood with reference to the accompanying drawings wherein.

DESCRIPTION OF THE PREFERRED EMBODIMENT

Figures 1, 2:
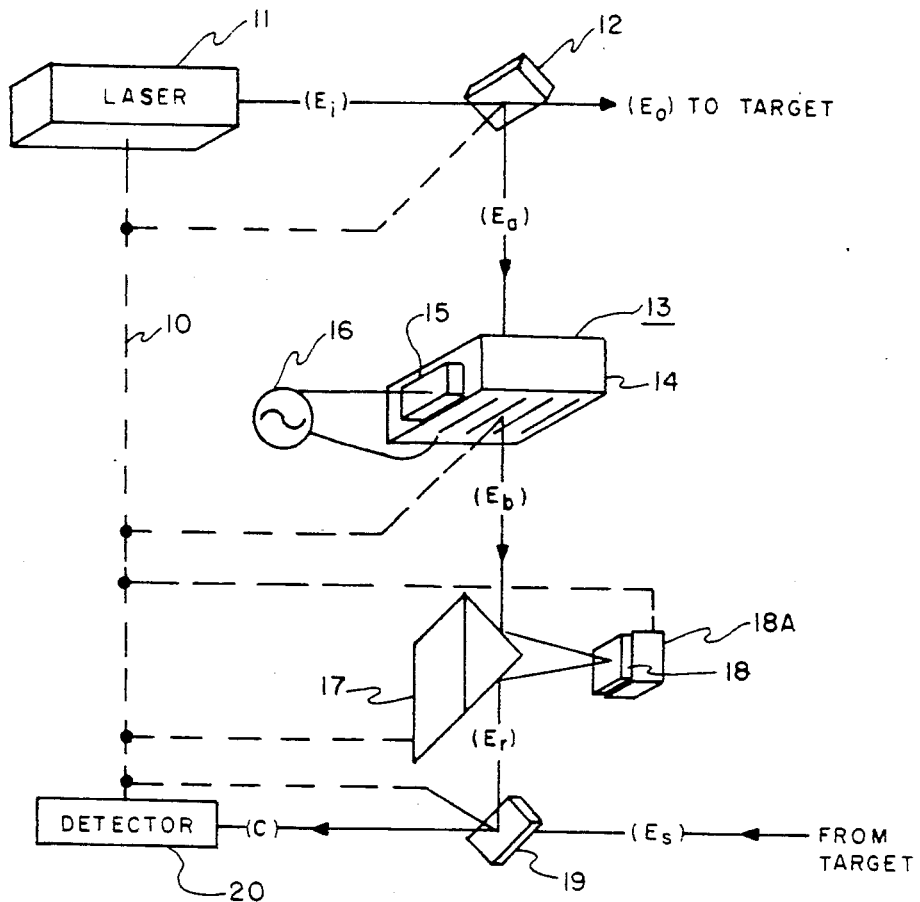
FIG. 1 shows a laser vibration sensor according to the present invention.
FIG. 2 shows equations of beams $E_r$ and $E_s$ that form the combined beam ($E_c$) which arrives at the detector, and the detector output C as functions of time (t).

As shown in FIG. 1 the vibration sensor system is mounted on an optical platform 10 and employs a laser 11 of moderate power, which has a wavelength at or near the visible spectrum. Such lasers are now relatively simple and inexpensive to procure and maintain. The system may include means to train the laser on a target (not shown). Such means could be additional mirrors firmly mounted on the platform with pivots and gimbal bearings, or the like, to set azimuth and elevation. As the initial laser beam ($E_i$) leaves the system on its way to the target it passes through a beam splitter 12, which creates an output light beam ($E_o$) and a reference light beam ($E_a$).

The output light beam travels to a target such as a vehicle. If the target is vibrating, the reflected light beam ($E_r$) is phase modulated by the radial component of the vibration, (i.e. along the axis of the beam). In order to reduce platform vibration noise, which is phase modulated on the output beam, it has been the practice to employ an acoustically quiet optical platform.

To demodulate the target-reflected light beam, a Bragg-Cell heterodyne technique is employed. The reference signal is passed through the active optical volume 14 of the Bragg Cell 13. The radio frequency (RF) oscillator 16 of the cell supplies an RF signal through transducer 15, e.g. about $4 \times 10^7$ Hz. The output beam ($E_b$) from the Bragg Cell is normally directly combined with the signal reflected from the target and the combination detected by the detector 20. When an acoustically quiet (fixed) optical platform is used the results are very satisfactory.

The present invention, however, uses a light but still rigid optical bench or platform. Such a system can be mounted in an aircraft or on a vehicle, for example, wherein a target can be viewed and tracked in motion. To compensate for the greatly increased vibration of the aircraft or vehicle platform a phase modulation unit consisting of an inverted dihedral reflector 17 and a reference mirror 18 are added to the sensor design. The dihedral mirror is rigidly attached to the platform, but the reference mirror, which is intentionally thick and massive is attached to the platform through a very compliant spring mass, such as an air bearing, foam rubber, or the like. The beam $E_b$ reflects from one 45 degree face of the dihedral mirror to the reference mirror. The reference mirror then reflects this beam to the complimentary 45 degree face forming beam $E_r$ aligned with beam $E_b$.

The beams between the dihedral and reference mirrors must be substantially parallel to the input and output beams $E_s$ and $E_o$. If the laser beam is directed by moving the optical platform, this is not a problem. If these beams are redirected by aiming mirrors, the dihedral and reference mirrors must be interconnected and rotatably mounted to the platform with no relative translation between the dihedral mirror and the platform normal to the reference mirror. Such mountings are well known in the art.

The beam $E_r$ is finally deflected to a detector 20 by a beam splitter 19 which like beam splitter 12 can also be a half-silvered mirror. The beam ($E_s$) created by ($E_o$) reflected from the distant target is directed through beam splitter 19 to the detector also, so that a combined beam ($E_c$) is received by the detector. The detector uses an optical mixing diode which extracts only the difference in frequency between beams ($E_s$) and ($E_r$).

FIG. 2 shows the equations for the beams involved in the heterodyne detection process. The beam returning from the target has in addition the basic frequency variation ($\omega_o$) a phase modulation ($\phi_t$) due to target vibration and a similar component ($\phi_p$) due to laser platform vibration. Owing to the presence of the Bragg Cell 13 the reference beam has a basic frequency variation greater than that of ($E_s$) by the frequency $\omega_1$ of the oscillator 16, and the same phase modulation component $\phi_p$ as present in ($E_s$). The RF output signal (C) represents the sum of beams $E_s$ and $E_r$. The detector 20 takes the square of the magnitude of this sum and produces an electrical signal, C(t) which contains the carrier frequency $\omega_1$ and the desired phase $\phi$ modulation of the target. The phase modulation due to the platform vibration is cancelled in the detection process. This signal can be further processed by filtering and the like to demodulate vibration frequency components. Such components can be compared visually or automatically with prerecorded vibration components for identification and study of the physical properties of the target by means well known in the art.

We claim:

1. In a laser vibration detection system mounted on an optical platform, and having a narrow output beam, wherein a portion of said output beam is split off as a reference beam and processed within said system as a means of detecting reflections of said output beam from a distant target, the improvement comprising;

a dihedral mirror firmly attached to said platform and an inertial reference mirror compliantly mounted on said platform, such that said reference beam is reflected between said mirrors parallel to said output beam.

* * * * *